United States Patent [19]

Rowley

[11] 4,344,384

[45] Aug. 17, 1982

[54] SEA LIFE HABITAT

[75] Inventor: Paul R. Rowley, Goleta, Calif.

[73] Assignee: Atlantic Richfield Company, Los Angeles, Calif.

[21] Appl. No.: 250,344

[22] Filed: Apr. 2, 1981

[51] Int. Cl.³ .................................................. A01K 61/00
[52] U.S. Cl. ................................................................ 119/4
[58] Field of Search ............................................ 119/2-4, 119/51 R

[56] References Cited

U.S. PATENT DOCUMENTS

| | | | |
|---|---|---|---|
| 3,702,599 | 11/1972 | Herolzer | 119/4 |
| 3,741,159 | 6/1973 | Halaunbrenner | 119/4 |
| 4,147,130 | 4/1979 | Goguel | 119/3 |
| 4,212,268 | 7/1980 | Chapman | 119/2 |

FOREIGN PATENT DOCUMENTS 2431252 3/1980 France .................................... 119/4

Primary Examiner—Jay N. Eskovitz
Attorney, Agent, or Firm—Roderick W. MacDonald

[57] ABSTRACT

A method and apparatus for growing sea life in an enclosed habitat in the sea which employs an enclosed module for containing the sea life with conduit means connected thereto for communicating with the interior of the module, one or more modules being supported on a support means which is carried by a base that rests on the sea floor.

3 Claims, 6 Drawing Figures

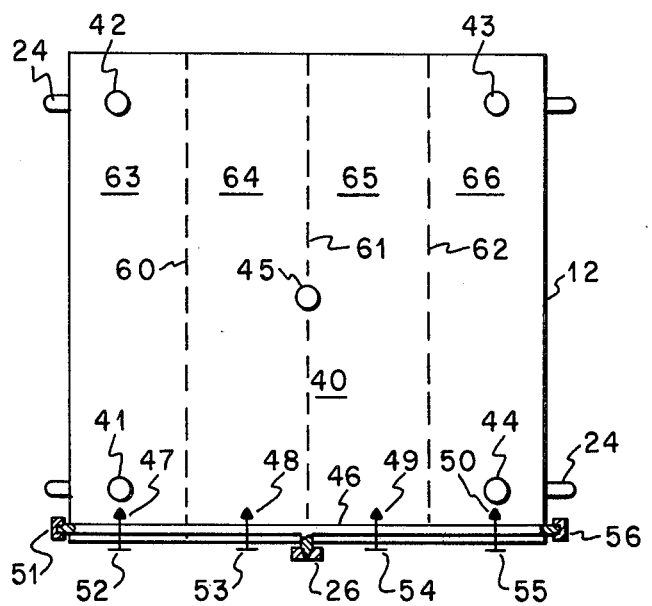
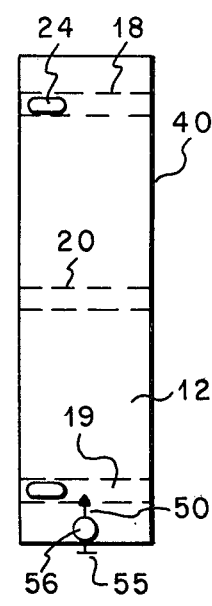
FIG. 4
FIG. 6
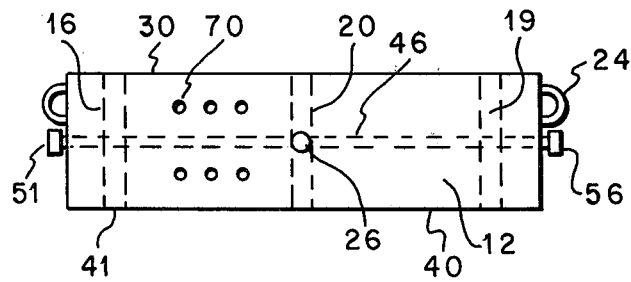
FIG. 5

SEA LIFE HABITAT

BACKGROUND OF THE INVENTION

Sea life, particularly rock-clinging gastropod mollusks such as abalone and the like, have been experimentally grown in an enclosed habitat comprising a cage suspended from an anchored structure such as an offshore drilling platform.

Although such an approach is quite acceptable from an experimental point of view, the continuous motion of the ocean causes wear on the suspension apparatus and could eventually cause a suspension failure and loss of the habitat so that such an approach is not desirable from a long-term commercial point of view.

This invention is directed towards a sea life habitat module, apparatus for supporting same, and a method for using same which is adapted to continuous commercial use.

SUMMARY OF THE INVENTION

According to this invention, there is provided a sea life habitat module comprising a closed chamber having an open interior and perforations in the walls, top, or bottom to allow circulation of sea water through the chamber, one of said walls carrying a conduit connection means by which a conduit may be connected thereto for communication with the interior of the module, the module carrying receiving means for following separate guide means.

The apparatus employing the above module comprises a base means adapted to rest on the sea floor, the base means carrying a support means for receiving and supporting at least one module, and guide means carried by said support means for guiding said at least one module to said support means, said guide means being adapted to mate with the receiving means on said module.

The method of this invention comprises emplacing the foregoing base means on the sea floor, lowering at least one of the foregoing modules to said support means along said guide means, and thereafter feeding said sea life in said module from the surface of the sea by way of said conduit means and connection means.

In the practice of this invention, a plurality of modules can be stacked on top of one another on a single support means.

Accordingly, it is an object of this invention to provide a new and improved method and apparatus for growing sea life in a captive habitat in the sea.

Other aspects, objects and advantages of this invention will be apparent to those skilled in the art from this disclosure and the appended claims.

BRIEF DESCRIPTION

FIG. 4 is a top view of a module within the scope of this invention.

FIG. 5 is a front view of the module of FIG. 4.

FIG. 6 is a side view of the module of FIG. 4.

DETAILED DESCRIPTION OF THE INVENTION

Figure 1:
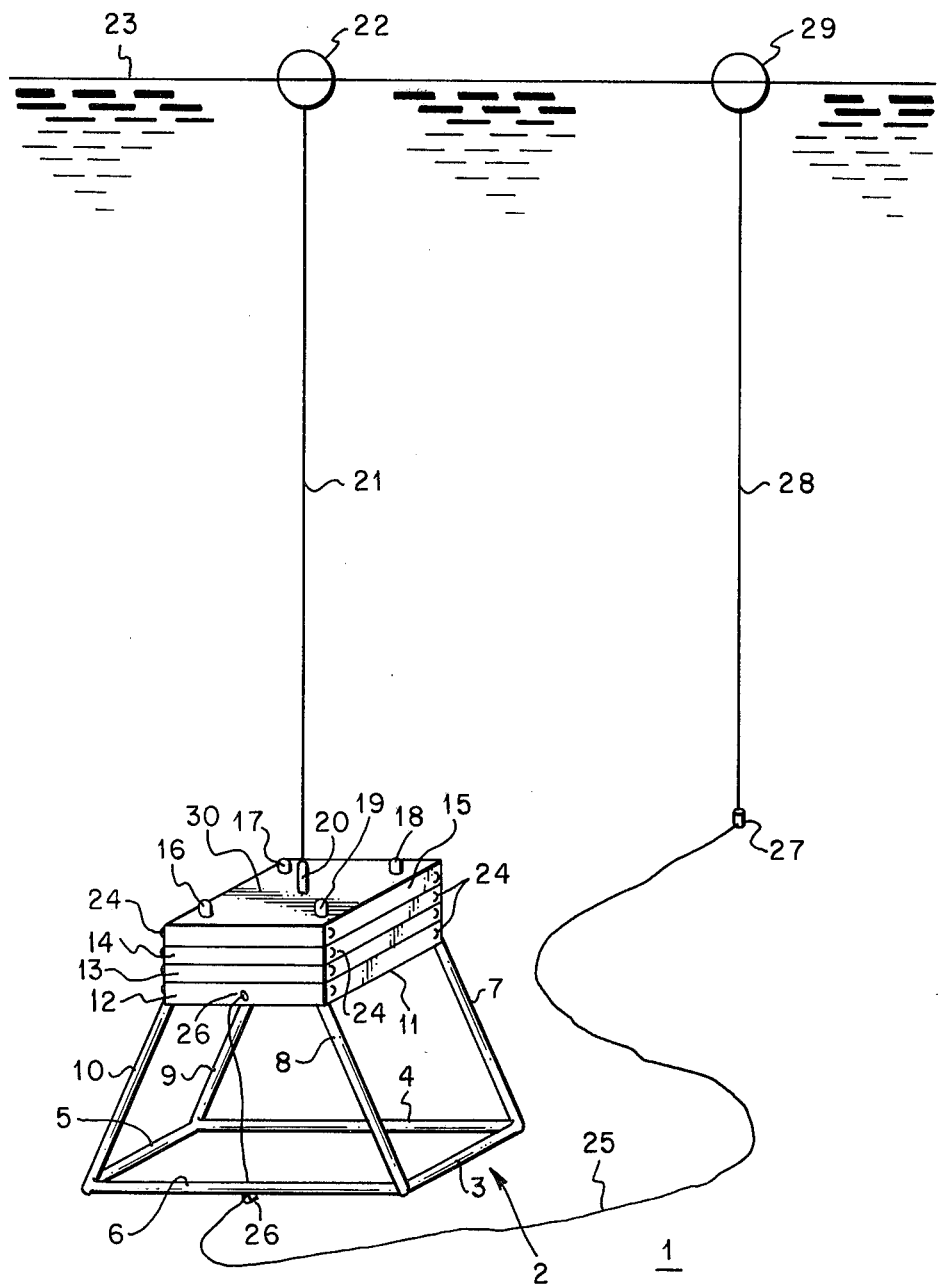
FIG. 1 shows apparatus according to this invention in place in the sea.

More specifically, FIG. 1 shows ocean floor 1 having base 2 resting thereon. Base 2 is composed of four tubular members 3, 4, 5 and 6 connected together and carrying at their joined corners upstanding, inwardly extending tubular members 7, 8, 9 and 10 which terminate in a raised platform or support means 11. Support 11 is essentially parallel to base 2 and sea floor 1. Resting on support 11 are four stacked modules 12, 13, 14 and 15 which rest on top of one another, which were guided on to the top of one another when being lowered towards support 11, and which are held in stacked relation on top of one another by guide means 16, 17, 18, 19 and 20, the top ends of which can be seen protruding from the top surface of upper module 15.

Center guide means 20 has connected thereto cable 21 which is fixed to buoy 22 which is floating at surface 23 of the sea. Each module carries at each outer corner thereof a lift ring 24 which is used for connecting a line (not shown) thereto for raising and lowering the module through the sea down to support 11 and back to water surface 23.

At least one conduit means 25 is connected to at least one connection means 26 on at least one side of module 12 so that communication is established between the interior of module 12 and the interior of conduit means 25 by way of connection means 26. Connection means 26 can be any well known device such as a threaded nipple or a more complicated quick connection device well known in the art for connecting hoses or other types of conduit means to a container.

The length of conduit means 25 is sufficient to reach from connection means 26 or some other point, for example, a point at which conduit means 25 is fixed to base 2 such as point 26 on member 6, up to the surface of the water. Loose end 27 of conduit means 25 is connected to a down line 28 which in turn is connected to buoy 29 so that, for example, conduit means 25 can rest on sea floor 1 when not in use but can be raised to water surface 23 by way of line 28 for connection to a feed tank carried by a ship (not shown) on surface 23 for feeding sea life in the interior of module 12 by way of conduit means 25. Similar conduit means are connected to modules 13, 14 and 15 as described for module 12 but are not shown in FIG. 1 for sake of simplicity and clarity.

Figure 2:
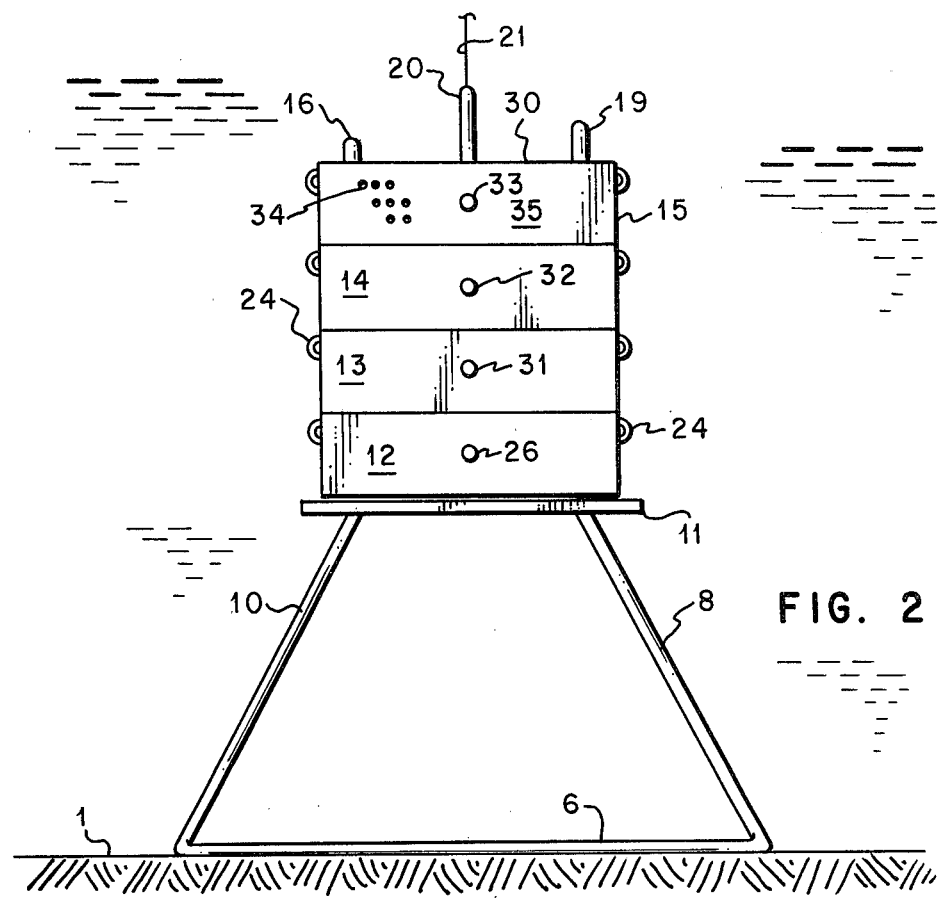
FIG. 2 is a front view of the apparatus of FIG. 1.

FIG. 2 shows the apparatus of FIG. 1 with conduit means 25 removed to expose connection means 26 of module 12. FIG. 2 also shows similar conduit connection means 31, 32 and 33 for modules 13, 14 and 15, respectively. Module 15 is shown to contain a plurality of perforations 34 in front side 35 to allow ingress and egress of sea water in relation to the interior chamber or chambers of module 15. Similar perforations are preferably supplied in at least one other side of module 15 and can be employed in the top and/or bottom sides of that or any other module within this invention if desired. Similar apertures would be employed in the other modules 12 through 14 but are not shown for sake of simplicity.

In the apparatus of FIG. 2, guide means 16 through 20 are fixed to support means 11 and extend through aligned apertures in the top and bottom sides of modules 12 through 15 so that the guide means in this embodiment of the invention are aligned apertures in the top and bottom sides of each module. The apertures are sized so as to receive guide means 16 through 20 and allow said guide means to pass into the bottom aperture, through the interior chamber of the module, and out the top aperture of each module. This way the guide means guide each module towards support 11 and retain the stacked modules in a stacked relationship as shown in FIG. 2 when in place and the lowering lines removed from eyes 24.

The modules containing sea life in their interior chambers then remain in place as shown in FIG. 2 until the growth cycle is completed and the modules are removed to water surface 23 for removal of the sea life therefrom.

Figure 3:
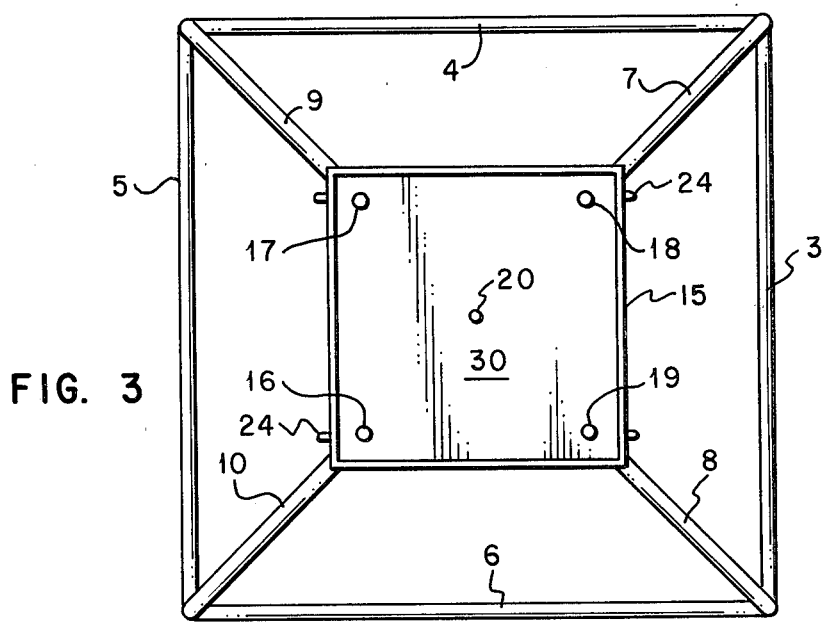
FIG. 3 is a top view of the apparatus of FIG. 1.

FIG. 3 shows the top side 30 of module 15 of FIG. 1 with its four raising and lowering eyes 24 at the outer corners thereof and guide means 16 through 20 extending therefrom.

FIG. 4 shows a top view of the interior of module 12 with its top removed to reveal the interior chamber of module 12 and bottom 40 of that module. FIG. 4 shows that bottom 40 of module 12 contains five spaced-apart apertures 41, 42, 43, 44, and 45 which are spaced so as to conform with the spacing of guide means 16 through 20 and sized so as to allow those guide means to pass through the module from bottom to top. Accordingly, guide means 16 passes through aperture 41, guide means 21 passes through aperture 45, and so on. Connection means 26 can simply pass directly into the interior of module 2 or it can be connected to a manifold means 46 which contains a plurality of outlet means 47, 48, 49, and 50. The outlet means better distribute the feed passing from the conduit means through connection means 26 and into the interior of module 12. Each of manifold means 46 and outlet means 47 through 50 are provided with clean out caps 51 through 56 which can be removed, have a hose connected thereto, and washed out should any of the pipes become plugged with material such as from conduit means 25.

The interior of modules 12 can be one large open chamber or can be divided into a plurality of sub-chambers as denoted by dotted lines 60, 61 and 62 thereby dividing the interior chamber into four sub-chambers 63, 64, 65 and 66. The latter provides a greater wall surface area for the sea life contained therein to cling to if that type of sea life is being contained in module 12. If sub-chambers are employed in a module, it is important that outlet means 47 through 50 be spaced so that an outlet means communicates with each sub-chamber.

FIG. 5 shows a front view of module 12 of FIG. 4 and shows by dotted lines where guide means 16, 20 and 19 would extend through that module when in place as shown in FIGS. 1 and 2.

FIG. 5 also shows a plurality of apertures 70 in the front side of module 12 which are provided for the same reasons as disclosed hereinabove with respect to apertures 34 for module 15. It should be added here that if sub-chambers 63 through 66 are employed, aperture means 70 should be provided for each sub-chamber and for at least two outside walls of each sub-chamber.

FIG. 6 shows a side view of module 12 and by dotted lines shows where guide means 19, 20 and 18 would pass through that module.

The apparatus of this invention provides an enclosed habitat which provides protection of the contained sea life from predators, poachers, and the like and, therefore, a lower than natural mortality rate with accelerated growth rate because of the convenient, controlled feeding of the sea life. By employing the module stacking feature of this invention, harvest expenses are reduced.

Reasonable variations and modifications are possible within the scope of this disclosure without departing from the spirit and scope of this invention.

The embodiments of the invention in which an exclusive property or privilege is claimed are defined as follows:

1. Apparatus for growing sea life in an enclosed habitat module in the sea comprising a base means adapted to rest on the sea floor, said base means carrying a support means for receiving and supporting at least one module, guide means carried by said base and/or support means for guiding said at least one module to said support means as said module is lowered through the water toward said support means, said guide means comprising a plurality of upstanding members spaced apart from one another over said support means, and at least one enclosed habitat module for holding said sea life, said module carrying receiving means for mating with and following said guide means, said module receiving means comprising a plurality of apertures which extend through said modules from top to bottom, said apertures being sized so that a guide member will pass therethrough, said apertures being spaced apart across said module so as to correspond with the spacing of said guide members so that said receiving means will mate with said guide members as said module is lowered toward said support means, said guide means being of a height so that their top ends just protrude from the top surface of the upper module carried by said support means, said module also carrying conduit connection means for communicating with the interior of said module for feeding purposes, and conduit means operably connected to said connection means, said conduit means being of a length adequate at least to reach the surface of the water.

2. The apparatus according to claim 1 wherein a plurality of said modules are stacked on top of one another on said support means, and conduit means are connected to each of said modules.

3. The apparatus according to claim 1 wherein said module carries a manifold means having a plurality of outlet means spaced along its length, and said connection means is in operable communication with said manifold means so that the content of said conduit means passes through said connection means into said manifold means and enters the interior of said module by way of said outlet means.

* * * * *